(12) United States Patent
Elder et al.

(10) Patent No.: US 7,606,422 B2
(45) Date of Patent: Oct. 20, 2009

(54) SYSTEM, METHOD AND COMPUTER PROGRAM FOR AN INTEGRATED DIGITAL WORKFLOW FOR PROCESSING A PAPER FORM

(76) Inventors: Michael James Elder, Elderberry Hill Farm, 14092 Yonge Street, Aurora, Ontario (CA) L4G 3G8; Robert N. Smith, 14 Caverley Drive, Toronto, Ontario (CA) M9R 2L8; Andrew Lewis Maxwell, 1774 Grosvenor Place, Mississauga, Ontario (CA) L5L 3V8

( * ) Notice: Subject to any disclaimer, the term of this patent is extended or adjusted under 35 U.S.C. 154(b) by 0 days.

(21) Appl. No.: 12/352,261

(22) Filed: Jan. 12, 2009

(65) Prior Publication Data
US 2009/0173552 A1 Jul. 9, 2009

Related U.S. Application Data

(62) Division of application No. 10/851,133, filed on May 24, 2004, now Pat. No. 7,492,946.

(51) Int. Cl.
G06K 9/00 (2006.01)
(52) U.S. Cl. .................................. 382/187; 382/115
(58) Field of Classification Search .............. 382/115, 382/181, 186–187, 305; 715/200, 221–226, 715/235
See application file for complete search history.

(56) References Cited

U.S. PATENT DOCUMENTS

| | | | |
|---|---|---|---|
| 6,456,740 B1* | 9/2002 | Carini et al. ............ | 382/187 |
| 6,707,466 B1* | 3/2004 | Van Sickle et al. ........ | 345/641 |
| 7,054,509 B2* | 5/2006 | Rom ...................... | 382/306 |
| 2002/0107885 A1* | 8/2002 | Brooks et al. ............ | 707/505 |
| 2006/0233441 A1* | 10/2006 | Clary .................... | 382/187 |

* cited by examiner

Primary Examiner—Daniel G Mariam

(57) ABSTRACT

A method, system and computer program for creating a digital workflow associated with the completion of a paper form is provided. An electronic clipboard includes a panel for receiving a paper form, a computer including a clipboard computer application, and an input device that completes the paper form with handwritten input data and also created digital signals corresponding to the handwritten input data. The computer application interprets the digital signal data so as to define digital input data, which corresponds to the handwritten input data. The electronic clipboard also includes verification/correction facility that enables the display of the digital input data and verification and correction thereof using a series of input devices provided on the electronic clipboard. The electronic clipboard is linked to a remote computer. The remote computer includes a forms creation and management application for the creation of the electronic forms, and definition of rules for processing digital input data includes in the various fields of the electronic forms. In a server implementation of the invention, the remote computer is an application server that provides access to a plurality of software utilities for processing the digital input data included in the electronic forms. The application server enables processes such as financial transactions associated with electronic forms, transmission of selected digital input data to other computer systems, and field level encryption. Another aspect of the invention is a point of sale device that include the electronic clipboard.

33 Claims, 10 Drawing Sheets

Sources of REVENUE

REVENUES

| WOWpad | WOWforms Server | WOWtraffic Manager | WOWtransaction Server |
|---|---|---|---|
| Hardware Sale, Wireless Royalty, Supplies, Service | ASP Hosting, Enterprise Licensing | Transaction Processing, Enterprise Licensing / ASP Gateway, API Licensing | ASP Hosting, Enterprise Licensing / Downstream Transaction Processing |

FIG. 5

1965 Britannia Road, Unit 5,
Mississauga, Ontario L5M 4Y4
Tel: 905 542 1505 Fax: 905 542 1506

Name

Address

City

Prov.             Code

Daytime Phone (    )

Pool Shape

Dimensions

Accessories

| Framing | ☐ X Frame ☐ A Frame ☐ Full top rail |
| Bottom | ☐ 2 stage ☐ concrete ☐ dura |
| Decking | ☐ 3" perimeter with bubble for diving pad |
| Back Fill | ☐ clear ☐ Weeping tile |
| Access | ☐ 1 m/c ☐ 2 m/c ☐ Fence removal |
| Liner | ☐ Standard ☐ Special ☐ Custom |
| Coping | ☐ 3 stage ☐ regular |

☐ Board       ☐ Lock in cover
☐ Slide       ☐ Lights
☐ Baracuda    ☐ Chlorinator
☐ Gas         ☐ Electrical

| Summary | Amount |
|---|---|
| Base Price | |
| Heater | |
| Safety Cover | |
| Baracuda | |
| Accessories | |
| Machine Access | |
| Extra Concrete | |
| Resodding | |
| Refencing | |
| Gas | |
| Electrical | |
| Subtotal | |
| P.S.T. | $0.00 |
| G.S.T | $5.00 |
| Total | $5.00 |

| Payment Schedule | |
|---|---|
| Upon Signing | |
| Kit delivered | |
| Liner installed | |
| Total | |
| Accepted by | |
| Customer | |

Additions to original contract

Building Permit Application

Method of Payment (Check One)    ☐ Customer   ☐ Prestige
☐ Check or Money Order Enclosed
☐ Purchase Order No. _____
Please Bill:   ☐ Visa ☐ MasterCard ☐ American Express Credit Card Number                                Expiration Date Authorized Signature

FIG. 7a

(CITY OF TORONTO)

Vehicle license: ☐☐☐☐☐☐
Date: ☐☐☐☐☐  Time: ☐☐☐☐
Location ☐☐☐☐☐☐☐☐☐☐☐☐☐
Precinct ☐☐☐☐☐☐☐☐☐☐☐☐

Make: _____  Model: _____  Colour: _____

Parking Offense

| | | |
|---|---|---|
| ☐ | Parking in Tow Away Zone | $50 |
| ☐ | Parking in Handicapped Zone | $150 |
| ☐ | Parking in Fire Lane | $100 |
| ☐ | Parking in Prohibited Area | $50 |
| ☐ | Time expired on meter | $20 |

Officer Name ☐☐☐☐☐☐☐☐☐☐☐
Number ☐☐☐☐  Signature _____

Payment Information

Method of Payment (Check One)
☐ Early Payment Discount

☐ Check or Money Order Enclosed

☐ Visa  ☐ MasterCard  ☐ American Express

☐☐☐☐☐☐☐☐☐☐☐☐☐☐☐
Credit Card Number
                      ☐☐ - ☐☐
_____  Expiration Date
Authorized Signature

FIG. 7b

SYSTEM, METHOD AND COMPUTER PROGRAM FOR AN INTEGRATED DIGITAL WORKFLOW FOR PROCESSING A PAPER FORM

This application is a divisional of U.S. application Ser. No. 10/851,133 filed on May 24, 2004 now U.S. Pat. No. 7,492,946.

FIELD OF INVENTION

This invention relates generally to technologies that enable the digitization of a data. This invention relates more particularly to technologies for digitally capturing data from handwritten data entry into printed forms, at the point of interaction.

BACKGROUND OF THE INVENTION

The most commonly used platform for mutual collection of data is completion of a form. (The term "form," as used herein, refers generally to a document (electronic or paper based) that is organized into a plurality of fields for data related to the plurality of fields. The data may include, for example, a signature, or a link to other data).

It is desirable in many environments to digitize information entered into forms and provide this data to other computer systems. One example is a service person attending at a residence to process an order for a swimming pool. The services person generally fills out one or more forms containing fields for data related to service ordering, ordering of equipment and supplies, calculation of payment, scheduling of personnel, processing of deposits by credit card, ordering of follow up services calls and so on. This data is desirable from the perspective of the pool installation company's scheduling system, accounting system and so on. Other examples including medical consent forms, medical treatment order forms, parking tickets and so on.

Numerous prior art solutions exist that fully digitized forms and make them available on a wide variety of devices, including for example hand held devices. There are a number of disadvantages to these prior art technologies. First, the adoption of the digitized forms requires behavioral change in users changing the way the work, often radically. With numerous key users bases this behavioral change has presented a very significant barrier to the adoption of these digital technologies. Second, these technologies have been generally costly to adopt, particularly when considering the training required for the user base to adapt to the change in their workflow. Third, and perhaps most importantly, with most applications of the prior art technologies completion of forms based on digital input is generally significantly slower than filling out forms manually. This results in yet another important barrier to adoption.

Other prior art technologies are directed to digital data capture after the manual form has been completed by the user. These technologies generally required the scanning and processing of the forms using OCR technology. This solution, however, is costly in that significant resources are expended in data entry and data correction, even with improved technology. Significant costs and time delays are also incurred in the physical collection, transportation, handling, sorting and storing these paper based documents. Also, it is often desirable or required to obtain feedback on the accuracy of the digitized form data from the user who originally completed the form. This is often necessary, for example, in medical applications of the technology. Even if the time that has elapsed between the completion of the form and the feedback request is relatively short, recollection may be imperfect or the further burden on busy staff that is presented by the feedback request may be undesirable. Further the cots imposed on the system for verifying and re-entering data are significant.

What is needed therefore is a technology that is based on digital capture of data linked to manual handwritten completion of a form by a user, in real time while the form is completed.

Technologies directed at this manual/digital form of electronic form data capture are known.

For example, A.T. Cross Company markets a CROSSPAD™ 35, a portable digital notepad that digitizes and records pen movements using radio transmission. The CROSSPAD transmits the recorded pen movements to a personal computer for processing and analysis. Similar technologies have been developed by Pegaus, whose PCNoteTaker uses a similar technology to turn movements of the pen into a digital X-Y steam.

Technologies are also known that facilitate the electronic capture of data while a paper based form is being completed in addressing specific problems that arise during operation. For example, U.S. Pat. No. 6,660,482 issued to WorkOnce Wireless Corporation provides a "Method and System for Form Recognition and Digitized Image Processing" which discloses a solution for achieving alignment between a digital ink image of handwritten information on a form with an image of the underlying form.

What is needed, however, is an integrated solution that enables the capture and real time character recognition to electronic data from a traditional form at the point of data capture and that processes the data using a pre-defined electronic workflow. There is also a need for a solution that enables data verification as part of a single transaction simultaneous with the completion of the paper based form, to create an intelligent learning system.

BRIEF DESCRIPTION OF THE DRAWINGS

A detailed description of the preferred embodiment(s) is (are) provided herein below by way of example only and with reference to the following drawings, in which:

FIG. 5 is a flowchart illustrating an aspect of the method of the present invention including generating transactional revenue based on processing of a form using the tablet of the present invention.

FIG. 7a is a representative paper form created in accordance with the present invention for digital capture and processing of data.

FIG. 7b is a further representative paper form created in accordance with the present invention for digital capture and processing of data therefrom.

SUMMARY OF INVENTION

The present invention provides an integrated solution for completing paper forms while capturing and processing the data therefrom in real time. An electronic clipboard is provided that enables real data capture, conversion and correction of resultant digital form data at the point of entry. The digital form data is transferred on a secure basis for processing over a wireless connection. Alternatively, the digital form data is stored on the electronic clipboard and transferred to a computer later, for example, by means of synching utility.

A forms manager is associated with the electronic clipboard which enables the creation of an electronic form or smart form version of the paper form. The smart form includes a plurality of rules for digital processing the smart form, including for example the handling of associated credit card or debit card transactions.

In the preferred embodiment of the present invention, the electronic clipboard is linked for two-way processing with the computer (a desktop in one implementation, a server computer in another). Loaded on the computer (or on linked computers) is programming operable to extract the data contained in the forms, including the traffic information about where appropriate pieces of data should be sent. The server software of the present invention has the ability to process the forms, and forward the information to the appropriate software through a suite of interfaces for further processing. Traffic rules can be used to establish two way communications, so that for example, credit card transactions, or other interactions involving verification of data collected, can be undertaken. The server software will track transactions, process financial transactions and confirm the completion of these activities in real time through communicating with the device.

In another aspect of the present invention, a related business model is provided based on charges for transactions, with an enhanced transaction charge for those interactions requiring two way confirmation. To this end, an accounting/billing utility and reporting utility are built into the software.

The present invention therefore defines an end-to-end digital workflow that coincides with the handwritten completion of the paper form. The solution therefore offers the advantages of paper forms (such as ease of completion and availability of a reliable audit trail) in combination with the advantages of a fully digital, integrated workflow.

The solution reduces the costs associated with forms processing by eliminating steps required to realize electronic data acquisition from paper based forms and allows interactive 2-way communications when used in a mobile environment.

DETAILED DESCRIPTION OF THE INVENTION

Figure 1:
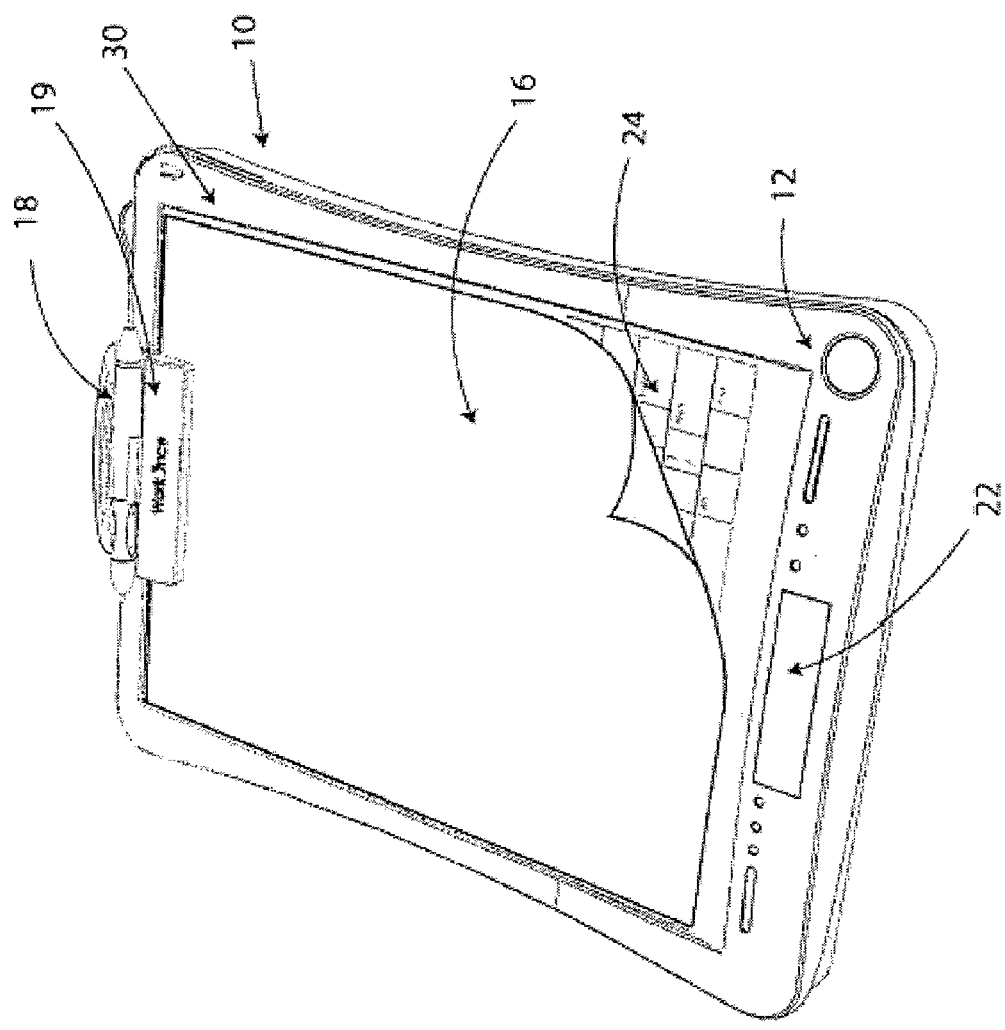
FIG. 1 is a representative illustration of one aspect of the present invention consisting of the tablet of the present invention.

One aspect of the present invention is the electronic clipboard (10) of the present invention, illustrated in FIG. 1. The electronic clipboard is provided using known hardware and software components. One aspect of the present invention is that the electronic clipboard (10) is designed and configured, in a manner that is known, such that its hardware, software and/or memory capabilities can be readily upgraded where required or desired for particular implementations of the invention (for example if biometric security is required then a fingerprint scanner can be easily added, the same for GPS or photo input).

The electronic clipboard (10) includes a microprocessor (not shown) and memory (also not shown), as well as a number of other utilities typical of electronic clipboard devices, provided in a manner that is known.

The representative embodiment of the electronic clipboard (10) of the present invention includes:

1. A clipboard body (12) that includes an attachment device (14) such as a clip to hold a paper form (16) in place.
2. A pen (18) which is operable to mark the paper form (16), but also to send a digital signal to the clipboard application (20) (illustrated in FIG. 3b). As particularized below, the clipboard application is operable to: (a) capture a digital "carbon copy" of the paper form (16) based on the movements of the pen (18) so as to create a digital image of the paper form (16); (b) convert the digital image using character recognition technology to an ASCII text version of the data input by the user to the paper form (16).
3. A display (22) is operable to display the ASCII text version referred to in (2) above, as interpreted by the clipboard application (20). The display (22) enables the user to review the digital data captured by the form on the fly. The display will also facilitate the transmission of information and instructions to the user, such as providing help, identifying problems or connecting thorough SMS protocols. The display (22) consists of, for example, a known LCD display.
4. The purpose of the display (22) is to enable the user to make corrections on the fly using a suitable input device. This has the benefit of making corrections contemporaneously with the completion of the form, rather than at a later date when the user may have imperfect recollection or it may be difficult for them to address their mind to providing input necessary for corrections, or confirmation of accuracy of corrections. An added benefit of the fact that the corrections are processed at the point of entry by the present invention is that, in another aspect of the clipboard application, the corrections made on the electronic clipboard (10) enable the clipboard application (20) to learn from the corrections to reduce errors in the future, in manner that is known. In a particular implementation of the present invention, the input device consists of a soft alphanumeric keypad (not shown in FIG. 1) which is located on the top of the electronic clipboard (10) and is accessed by the user lifting the bottom of the paper form (16).
5. The electronic clipboard (10) also includes two communication facility consisting of interface protocols (not shown) that enables the electronic clipboard (12) to communicate with the server (26) of the present invention, or the desktop computer (28) (illustrated in FIG. 2. In a first example of an implementation of the present invention, the clipboard (10) uses wireless (80211 or GPRS/GSM) or wire communications (Ethernet) technology to communicate directly or indirectly (through a local P.C.) with the server (26) (over the internet). In a second example, the clipboard uses wireless (Bluetooth or Infrared) or wire communications (USB, Ethernet etc) to download directly to an individual computer such as the desktop computer (28) for local data storage. The communications technology included in the electronic clipboard (10), in one particular embodiment thereof, includes at least one USB port and one dedicated port for hardwire connection to the desktop computer (28), this could also be via a docking station for example.

6. The preferred embodiment of the present invention also includes a known swipe card (30) for swiping a credit card, health card or debit card, for example.

It is also desirable that the electronic clipboard (10) include means for positive position verification so that the clipboard application (20) can determine which field in the electronic form corresponding to the paper form (16) a particular entry on the paper form (16) made with the pen (18) relates. By way of illustration, the electronic clipboard (10) of the present invention utilizes the position verification described in U.S. Pat. No. 6,660,482.

Also, the representative embodiment of the electronic clipboard (10) of the present invention also includes or can be fitted to include:

Smart controls and a scroll button for navigating to selected text of data captured by the clipboard application (20) and displayed in the display (22).

A biometric authentication device such as a finger print bio sensor.

One or more speakers.

Compact flash.

A microphone.

And so on.

In one aspect thereof, the clipboard application includes an ASIC based handwriting character recognition engine that provides fast, near real-time algorithm processing on the electronic clipboard (10).

The data captured and converted by the electronic clipboard (10) is either stored in the local memory in the clipboard, or preferably is transmitted by means of a secure wireless connection (provided in a manner that is known) to the server (26) of the present invention. The data transmitted from the electronic clipboard (10) is securely encrypted so that it can be safely and securely sent over the Internet, and can only be un-encrypted by the server application with the appropriate encryption key and/or authentication data.

Figure 2:
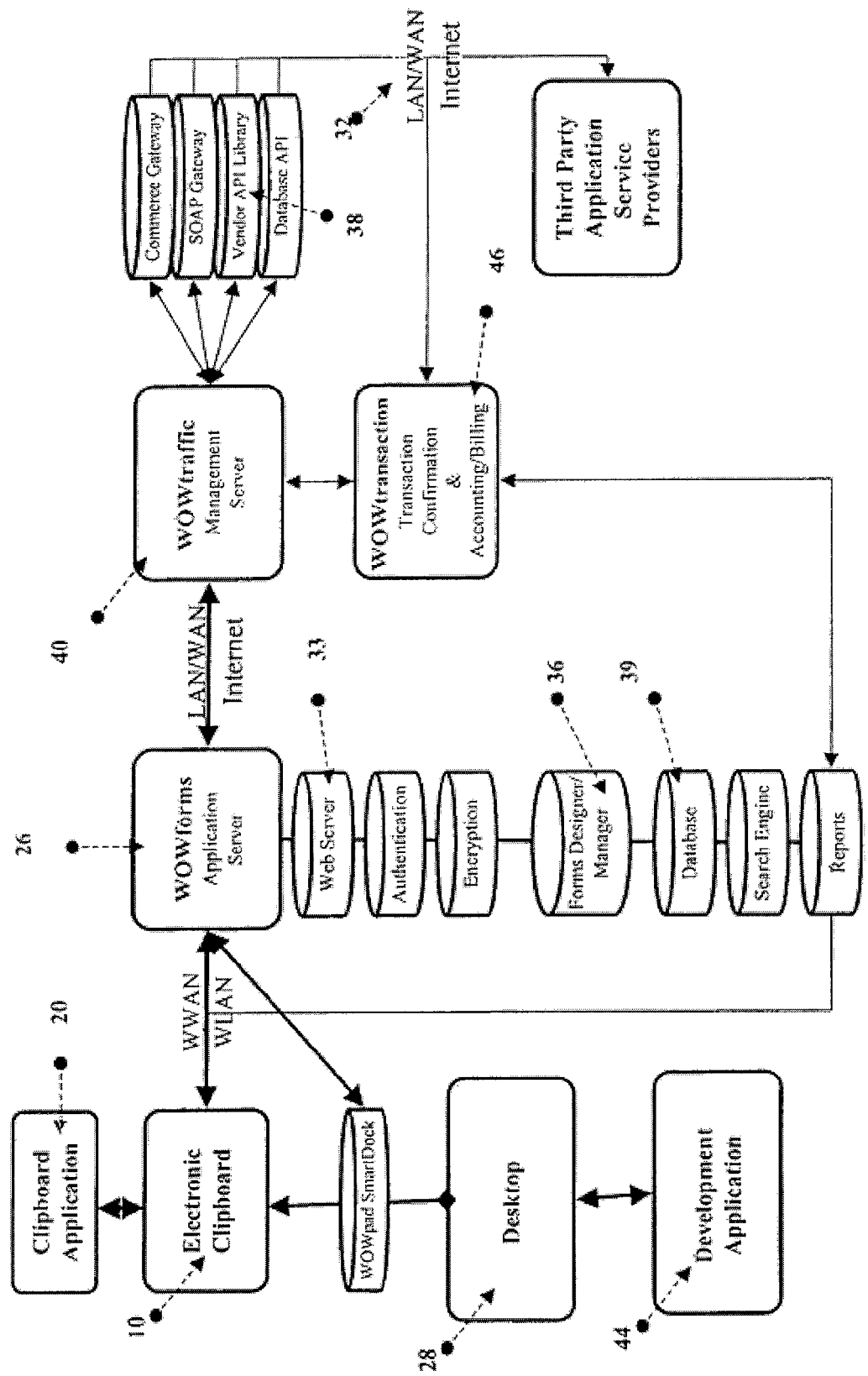
FIG. 2 is a resource diagram illustrating the resources of the system of the present invention.

FIG. 2 illustrates the system of the present invention. The electronic clipboard (10) is linked to the server (26) or Application Server (in one embodiment thereof), preferably by means of a wireless connection such as a Wireless Wide Area Network or a Wireless LAN (32). The Application Server (26) includes a web server (33). The server (26) includes a database server (34) that preferably provides a secure repository for data transmitted by the various electronic clipboards (10). The database server (34) restricts access to users only to their own data, in a manner that is known.

Figure 8:
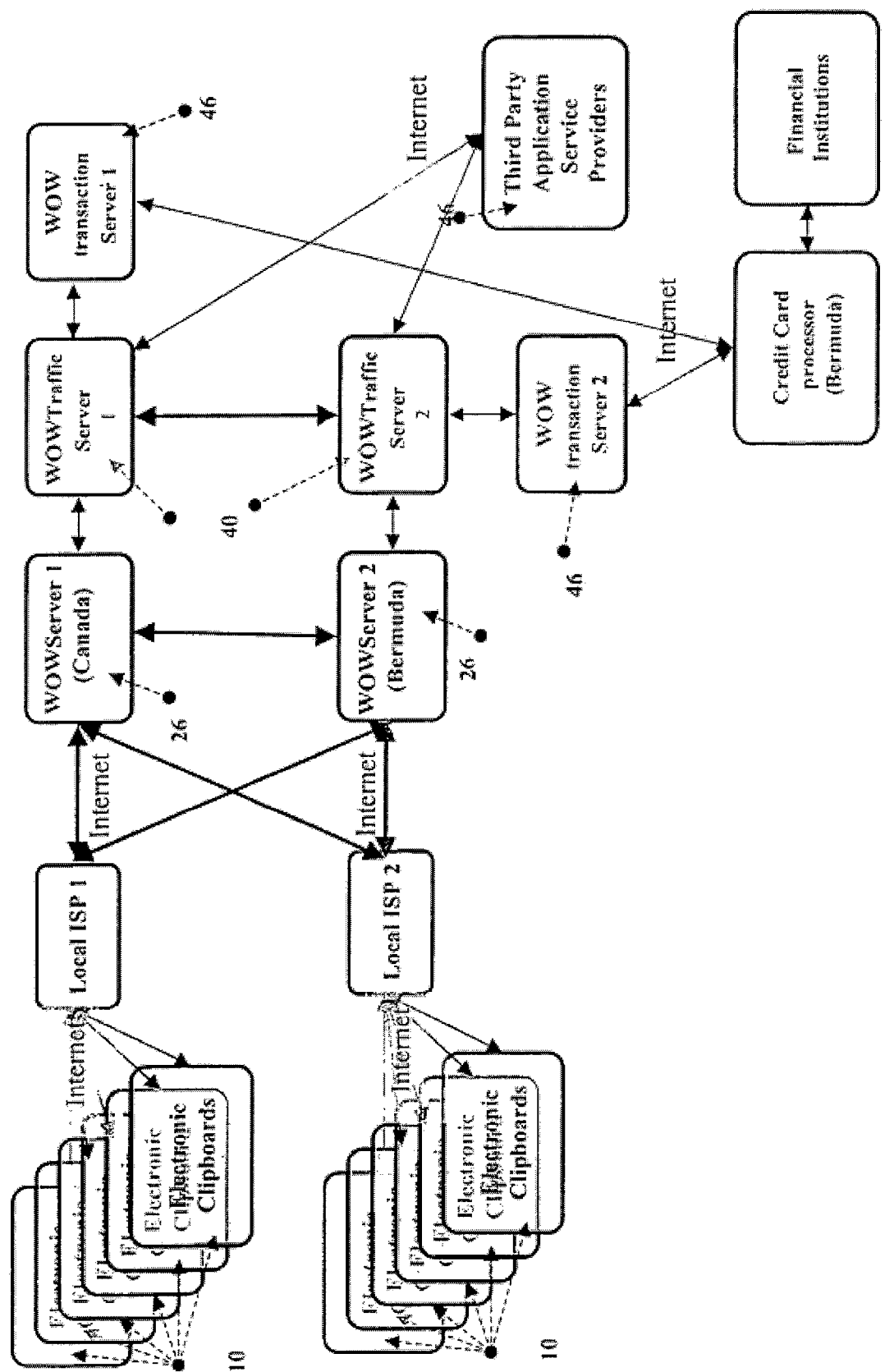
FIG. 8 is a diagram of the servers and the processing of communication rules.

As shown in FIG. 8, the configuration of the server (26), including the traffic server (38) and the communications rules embedded in the electronic form are designed to operate in a redundant system environment, in a manner that is known. This means that should there be a problem, with gathering, collecting and processing data at one location, the other remote location can be utilized.

The Application Server (26) is also linked to a forms manager (36) consisting of a management application suite that enables the design of forms supported by the solution of the present invention.

The forms manager (36) provides a series of known user interfaces for defining the workflow, in accordance with the present invention. This workflow includes the definition of an electronic form or smart form corresponding to a particular paper form (16), as well as the rules (field by field) for processing the same.

The forms manager (36) creates the electronic form based on a plurality of "smart fields" defined by two principal components. (1) Properties and (2) Preferences. Properties define field formatting and validation requirements, while Preferences define workflow in relation to the Traffic Server (38) described below.

Upon creation of a smart form, the user must define the field Properties by operation of the forms manager (36), including the following:

Field Label—Name, Address, etc. . . .

Field Type—text, number, date, time, image, calculation

Field Formatting—Check Box, Radio Button, Auto Text (1=Yes, 2=No, 3=Maybe . . . ), character length (min, max), font format (size, bold, italic, etc. . . . ), auto format (MM/DD/YYYY, Caps, Small Caps, etc. . . . )

Field Options—Auto Enter (date, time, serial number, data, lookup, calculated value, etc. . . . ), Data Validation (strict data type, not empty, in a range, Max # of characters, etc. . . . ), Repeating Field (same field name with repeating entries such as a parts list, or invoice line item)

The derivative of these defined Properties is a smart form definition profile that is used by the electronic clipboard (10) for defining data capture field values, character recognition and data formatting rules, while the Application Server (26) uses this information to define the data management schema and storage requirements.

The integration of the properties field into the smart form, severely constrains the variations in data input and the possible outputs, allowing speedy, real time verification of characters. This has the benefit of improved accuracy, reduced response times and lower processing power requirements.

The Preferences relate specifically to pre-defined traffic 'objects' that are created using the Application Programming Interface or API Library (38) linked to the traffic management server (40). Data that is required to be passed on to third party corporate databases, commerce gateways or to third party CRM/ERP/Accounting applications must be pre-defined for location, method and format for the data exchange. The Preferences interface allows the Form designer to select the appropriate values needed to process the data via the traffic management server (40). Each such traffic object is generally comprised of three components: an API; a Field Definition and Remote Data Verification, defined in a manner that is known.

Since each smart form generally includes multiple fields, for each of which there may be a separated destination that the data contained in that field is to be processed to, there is no limit to the number of traffic objects that can be used in a single smart form. The API defines the remote system that will be processing the smart form, the Field Definition is the field that is expected by the remote system (i.e.: Customer ID, Address, etc. . . . ). It is generally required that there be a field defined on the smart form that corresponds to the field definition on the traffic object. Finally, the Remote Data Verification determines whether or not the remote system will pass back a value in real-time to the electronic clipboard (10) or a confirmation notice to the Billing/Accounting server or simply a handshake confirmation that the data was received successfully (i.e.: Confirmed or Failed).

The following represents an example of the forms manager (36) in operation. A Sales Order form is created for a pharmaceutical company. The sales rep has completed a sales call and fills out the form which includes requirements for restocking of existing inventory and free samples of a new product. When the order is completed and forwarded for processing, there are traffic server objects that are used to process the data. The first is an SAP API which will take the entire order (except the Free Samples line items) and pass the data to the company accounting and inventory system. The second API will pass the client information and sales summary information to the SalesForce.com API which is used by the sales team to track calls and closing ratio's, and finally the sample order information will be passed to an ORACLE API which is used by the Product Marketing group to track samples so they can follow up on their market research.

The present invention also contemplates a desktop application (44) loaded on the desktop computer (28). As illustrated in FIG. 3b, the desktop application (44) provides features corresponding generally to those of the Application Service Provider (26), hut typically in a "LITE" implementation thereof. The desktop application is used to manage the clipboard application (20), and includes a utility corresponding to the forms manager (34) described above.

Figure 3A:
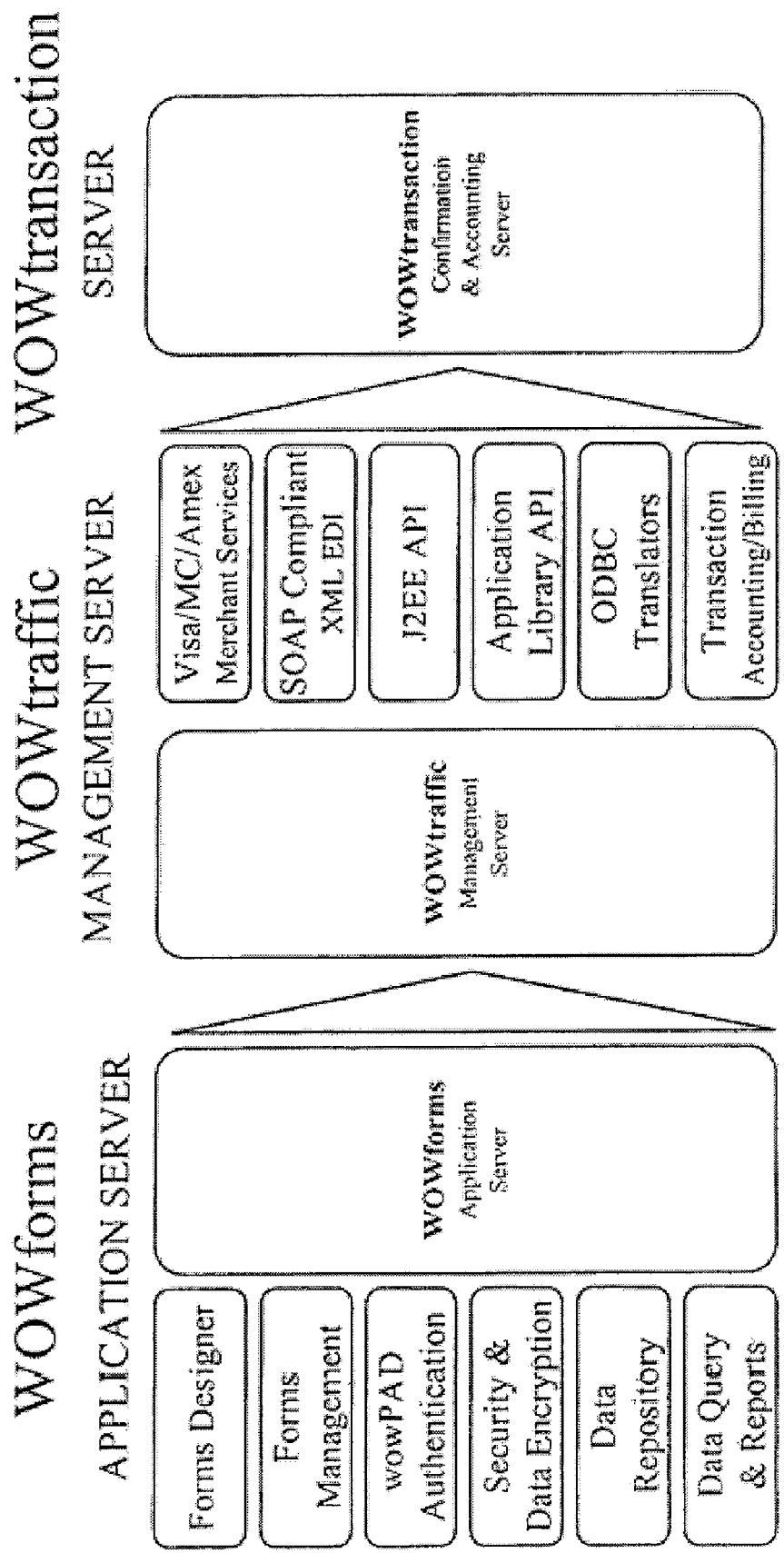
FIG. 3*a* is a program resource diagram illustrating the principal resources of one aspect of the computer program of the present invention consisting of a server application.
Figure 3B:
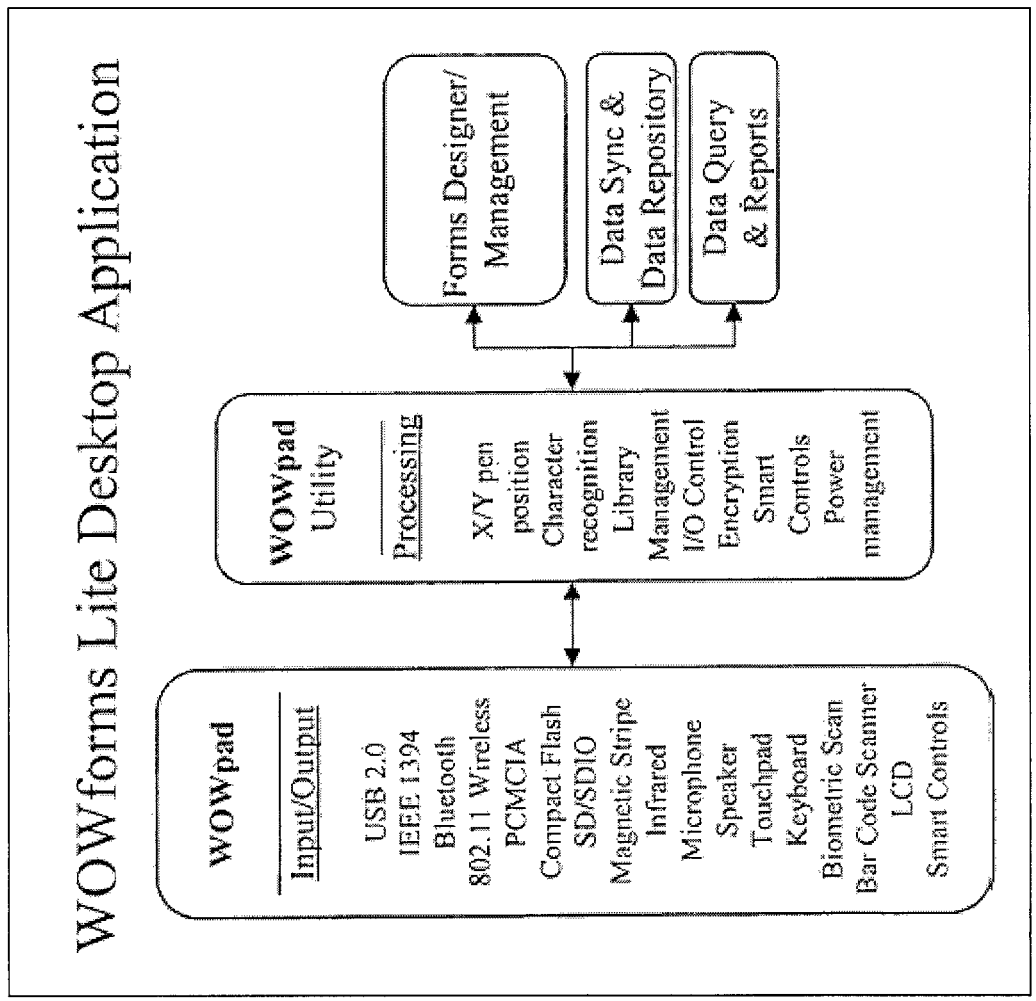
FIG. 3*b* is a program resource diagram illustrating the principal resources of another aspect of the computer program of the present invention consisting of a desktop application, and further illustration of the resources on the tablet, in one embodiment of the invention.

As best illustrated in FIG. 3a, the traffic management server is linked to the Application Service Provider (26) and enables smart routing functions (as mentioned above) and in particular connects the Application Service Provider (26) to other networks and systems using several gateway functions such as commerce transactions using Merchant VISA/MasterCard, data exchange using SOAP/XML, a JAVA based Application Programmers Interface (APT), an application library API which provides a specific set of standards for particular legacy systems such as PeopleSoft, SAP, SAS, Siebel, Oracle, etc. . . . , and finally, a set of ODBC Translators allowing data to be routed directly into corporate databases.

FIG. 3b illustrates the resources of the computer application of the present invention loaded on the desktop computer, in another embodiment of the present invention.

Figure 4:
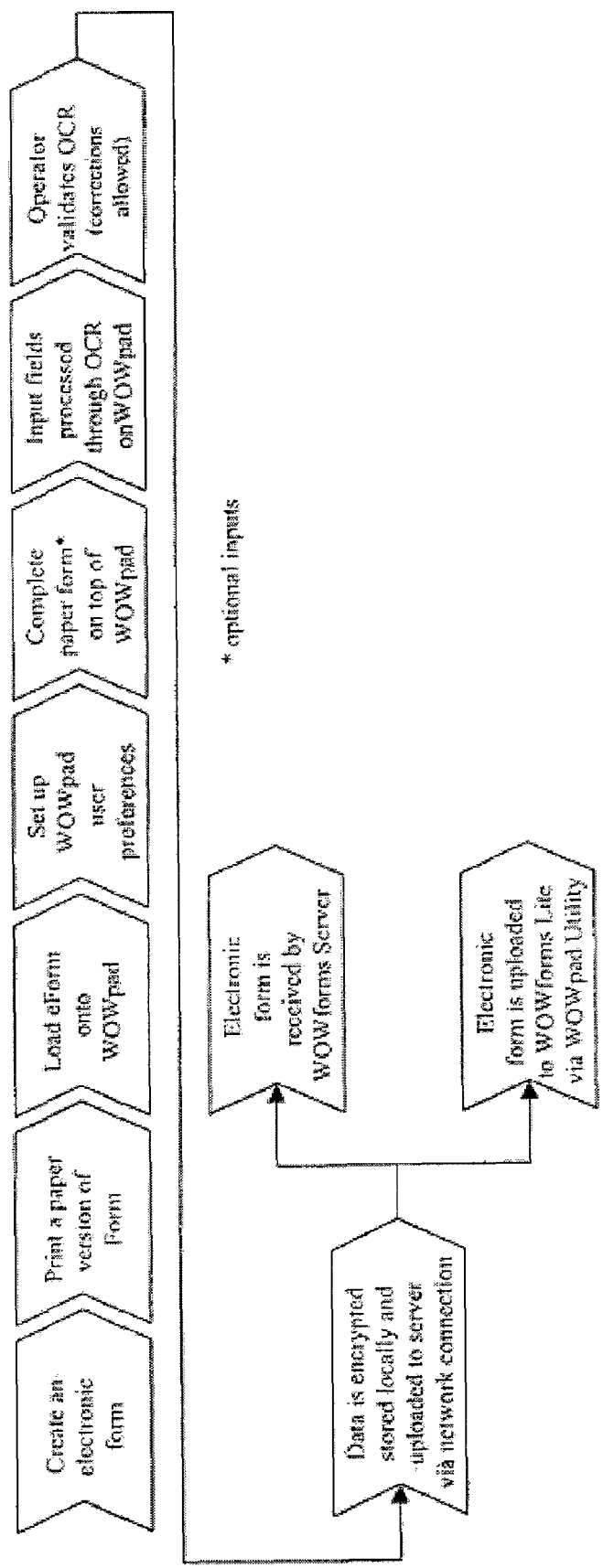
FIG. 4 is flowchart illustrating the steps involved in capturing data electronically in accordance with the method of the present invention.
Figure 6:
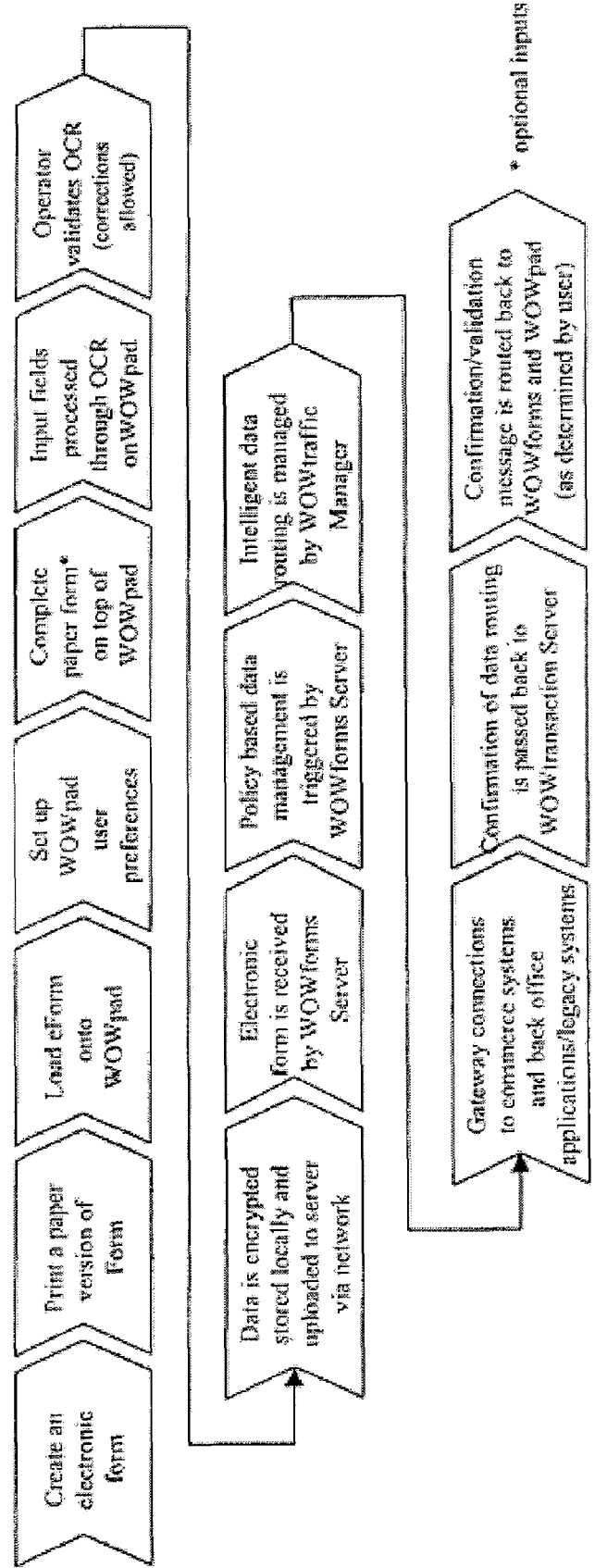
FIG. 6 is a further flowchart illustrating the method whereby the invention is configured to provide end-to-end security.

FIG. 2 also illustrates the transaction server (46) linked to the traffic management server (40). The transaction server (46) functions as a verification agent for all Smart Routed data which can be used to track and manage transaction based revenues (as explained below), returns Real-Time confirmation notices to the electronic clipboard (10), and interfaces with the web based reporting tools for billing/accountability to the end user FIG. 4 illustrates the data capture workflow associated with the electronic clipboard (10), in one aspect of the method of the present invention.

Create an electronic form using the forms manager (44) (whether the web based tool provided by the Application Service Provider (26) or the PC 'Lite' version of the application provided by the desktop application (44)). The following consist of the stages involved in creating a smart form in accordance with the present invention:
Create a smart form (each smart form is given a unique identification number).
Choose paper size (Letter, Legal, Custom).
Place a scanned image if using an existing printed form or turn on alignment grid.
Using the object library tool, drag and drop pre-defined fields onto the form.
Adjust the size and location of the fields.
Set the field properties by double clicking on the fields.
Set Data Format Properties.
Set Data Validation Properties.
Set Smart Routing Properties and Smart Actions.
Add lines, borders logos and other design elements to the form. Save.
Print the smart form to local printer or save as .PDF to send to a commercial forms printer.
Turn on the electronic clipboard (10), for example, by removing the pen (18).
Connect the electronic clipboard (10) to the desktop computer (28) to the Application Server (26) and thereby downloading the specified smart form onto electronic clipboard (10).
Set up the electronic clipboard (10).
User ID, Form ID, Smart Controls (hot keys)
Place paper form onto electronic clipboard (10).
Select the corresponding electronic form, for example, by operation of the smart controls.
Complete the form using the pen (18) and other data capture input devices.
Written data will be converted to ASCII text by operation of the clipboard Character Recognition (CR) application (20). The CR's data can be verified and corrected using the smart keypad and associated navigation tools in conjunction with the LCD display (22)
Data is encrypted, saved locally and can be uploaded to the server (26) by operation of the wireless connection referred to above.
Smart Field verification and validation can occur in Real-Time where the electronic clipboard (10) is network enables.
If the electronic clipboard (10) is not network enabled, uploading and verification of smart field data stored to the memory of the electronic clipboard (10) will occur when the unit is docked to the desktop (28).
The User determines if data is routed to server (26) or the desktop (28).

Form Completion
The pen (18) is used to complete the fields indicated on the printed form (16).
As the fields characteristics have been specified, completing character recognition, one character at a time, is relatively easily achieved, by operation of the clipboard CR application (20).
Results of the character recognition are viewed in real time in the LCD display (22).
Mistakes can be rectified using the smart controls, touch pad (24) or the smart pen (18).
Using the smart controls, the text with the error is located in the LCD display (22), using the smart controls or the scroll button. The paper is then lifted and the correct character or characters entered in the correct location using the touch pad (24).
Alternatively the erase button on the smart pen (18) can be activated, the pen (18) used to white out the original error and then deactivated and the correct character or characters entered.
Changes can be indicated on the paper form (16) if required
Increased accuracy of character recognition can sometimes be achieved by providing an initial training session for the user to populate a library, by providing additional libraries of information: in the electronic clipboard (10) of the present invention (for example by an enhanced dictionary function), by accessing the correct data wirelessly or by creating an intelligent character recognition engine which can be trained to recognize a specific users writing, the engine being provided on the electronic clipboard (16) and learning based on the correction function.
Additional functionality can be provided, by using the mobile activated mode, to achieve real time interactive transactions. Data can be sent (when a field is completed, and based on the smart rules) for verification and processing through the Application Server (26) and the traffic management server (40). Confirmation of the transaction can then be sent back to the electronic clipboard (10) and displayed on the LCD display (22).

Specific fields can be designated for drawings or secure signatures where appropriate, in a manner that is known. Field based encryption rules can be adopted based on specific applications and mandated requirements. Specific parameters for field based encryption, including for example the specific encryption technology and/or standard to be used, can be selected and incorporated into an electronic form based on operation of the Properties. For example, by this method, a user may select from a range of available encryption technologies, such as synchronous or asynchronous encryption technologies from a variety of vendors such as RSA™, ENTRUST™, or others. The field level encryption may occur on the electronic clipboard (10), the server (26) or both, by operation of the Properties.

As mentioned earlier, the electronic clipboard (10) includes a number of unique technology features which enhance the value of the process. These include:

Biosensors to verify either the user or the customer involved in completing the form Microphone/Camera for capturing audio/video data at the same time as the basic form.

Swipe card (30) or Bar code reader/RFID reader for capturing data about people or products in a real time environment Time/Data/Location stamps to confirm basic details around the capture and completion of the form.

FIG. 5 shows the data processing features of the Application Server (26), the traffic management server (40) and the transaction server (46), in one particular embodiment of the present invention.

Data is captured and processed by electronic pad (10) and electronic data is uploaded to the Application Server (26) for processing.

Encrypted data is stored in the memory of the electronic pad (10) and can be organized by individual, department or company based on preferences established by the electronic pad user Policy based Smart Routing will be invoked by the Traffic Management Server (40).

Smart Routing will route encrypted data from the Application Server (26) to an alternative application or gateway for data authorization, validation and commerce transactions.

Multiple gateways and sophisticated data routing schemas can be triggered from a single form.

Confirmation from remote systems will be received by the Transaction Server (46).

Transaction based revenue occurs on each leg of the upstream and downstream traffic that passes through the gateway is contemplated. For example, if smart routing passes data from the form to 3 destinations and a confirmation message is required back on the commerce transaction—that represents 4 separate transactions [3 upstream and 1 downstream]. A confirmation is required for all smart routing but only those that require a Real-Time response or confirmation number will be charged for, i.e. 2 transactions.

One aspect of the present invention is a business model which consists generally of carrying or subsidizing the infrastructure costs (cost of electronic clipboard (10) as well as access to the resources linked to the Application Server (26) for forms creation and processing) is funded based on a per transaction cost (particularized below). This per transaction cost is defined, for example, as a per form processing cost that is lower than the demonstrable per form processing cost using prior art technologies. The business model of the present invention represents significant saving to an enterprise adopting the mobile paper solution of the present invention. The following illustrates the saving realized in accordance with the invention:

1. Data entered into the form is verified at the point of entry—reducing the amount of time wasted in going back to the enterer or the customer to verify data not entered correctly.
2. Completed forms do not have to be transported back to the office—reducing the cost associated with sorting, collecting and transporting the documents.
3. Forms do not need to be received, handled, stored at the office—reducing the labour costs associated with the physical handling of the completed forms within the recipient's office.
4. Forms do not need scanning—reducing the cost of handling the forms being entered and the cost of scanning itself.
5. Scanning errors reduced—reducing the number of forms which have to be manually verified and the subsequent rework.
6. Process delays are significantly reduced—improving cash flow and customer service.
7. The number of documents lost through the process is substantially reduced—the cost of rework is significantly reduced.
8. Ease of collection of additional data increases utility—reducing the cost of collecting data from a variety of sources.
9. Real time verification of forms data—reduces the number of incorrect forms completed and the associated rework.

Based on this there is a significant savings in material handling and other costs which is the basis for business model of the present invention. By basing the charge to the client on a per transaction basis, the focus of the mobile paper solution of the present invention becomes providing a "Return on Investment" rather than device cost.

WorkOnce will base its agreement with clients on the following four charges:

the Provision of electronic clipboards (10) to each mobile worker ($ per employee).

the establishment and operation of the Application Server (26) per organization ($ per company).

the transmission of data from the electronic clipboard (10) to the portal provided by the Application Server (26) through the portal ($ per form).

the provision of valid return data confirming transaction (S per additional revenue earned).

In another implementation of the present invention, the server application of the present invention (described in association with the Application Server (26)) is licensed for installation at customer sites, when there is a logical benefit to self management. This will be particularly appropriate where the collection of data is fully integrated into the main databases of the company, where there is significant two way interaction as the form is completed, or where security requires minimal access to data externally. In this case, there will be a component of each of the four charges maintained in the license model, but the enterprise cost will rise and the cost per transaction will be reduced.

Other implementations of the present invention are possible:

(a) Individual users who will purchase the electronic clipboards (10) and a light version of the software of the present invention, and use in either a standalone or wireless opportunity.

(b) OEM organizations who wish to license the clipboard application (20) and the forms manager (36) and the Server/Traffic solutions software described above (perhaps with certain hardware components). Such an organization would then have the ability to build and deploy the mobile paper solutions described herein for their enterprise customers.

(c) Other revenue opportunities can be linked to the mobile paper solution of the present invention including forms design, data archiving and provision of wireless services. Each can improve the overall viability of the organization.

1. Another aspect of the present invention is a credit card processing system, which while providing the reliability of a paper trail (by means of a paper form (16) consisting of a credit card slip), also provided real time integrated digital processing. The attributes of this system are:
   a. It allows the numbers on the card to be entered by hand, and then automatically converted to data for subsequent processing (either in real time with online transaction verification or batch processing at the of the day).
   b. It stores the signature information digitally, at the time of data collection, for subsequent audit or verification purposes, without the need to keep a back up piece of paper.
   c. It allows transaction data, including drawings, order information plus other inputs (such as location, time and place) to be integrated into a single electronic format
   d. It allows the point of real time customer interactions to be distributed in a geographic location using local wireless infrastructure to link into data processing systems (i.e. processing complex orders in a retail showroom).

The present invention also enables the creation of legally binding transactions, which require both paper documentation and a signature. In certain cases the standard data can be augmented by using the enhanced technology functionality available in the electronic pad (10). Such transactions may include:
1. The completion of an insurance form requiring a signature.
2. The completion of an accident report including addition of a picture (using optional camera).
3. The completion of a house purchase involving a time and date stamp.
4. The completion of a police evidence report, requiring a time, data and location stamp (using optional GPS).
5. The completion of a statement, requiring confirmation that both the police officer and the provider of the statement were both present, through the addition of finger print information (using optional biometric reader).

Further Examples in Operation

A. Example of the electronic clipboard (10) of the present invention in a non wireless environment.

Completion of a swimming pool quote by contractor (see example form attached as FIG. 7*a*)
1. Creation of Smart Form
   The SmartForm is designed online using the forms manager (36) as explained above. Fields used will include:
   a. Name, address, contact information
   b. Date of quote
   c. Start and completion date for work
   d. Options for pool selection
   e. Drawing of pool shape
   f. Electrical, gas and landscaping information for sub-trades
   g. Price
   h. Deposit information (including credit card payment and signature)
2. Inclusion of Smart Rules:
   Each of these fields will include certain rules around the field properties, such as the nature of the characters or fields being entered (i.e. text, numeric, picture), the rules of the text (date should be today's date, completion date should be after start date), any smart rules, (i.e. whether a field is required or optional) and smart traffic (preferences) rules which can be applied at the field level, (such as credit card information to credit card company, pool dimensions to pool manufacturer, relevant sub trade information to sub trade, permit application to City).
3. Downloading of electronic form:
   In this case the web based print form (PDF) (16) and the smart form are downloaded to the desktop computer (28). The print form (16) is printed for subsequent completion on site. The smart form (the electronic version of the print form (16) created by operation of the forms manager (36)) is downloaded to the electronic clipboard (10), in this case over the wireless connection (which is an infrared connection).
   In other cases the form may be printed off site and sent to the user from the printer. Also the smart form might be directly downloaded to the electronic clipboard over the wireless connection which is an embedded 80211 wireless card, or an Aircard (not shown).
4. The paper form (16) is placed on the electronic clipboard (10) and aligned by verifying two touch points with the pen (18), by operation of the positive position verification mentioned above.
5. The paper form (16) is then completed, one field at a time. A graphic representation of the handwriting will be displayed in the LCD display (22) as it is entered. As the next field is entered, the characters from the previous field will be converted to text using handwriting character recognition. If there is a validation error, there is an audible alarm.
6. Corrections are made as explained above.
7. Once all the data has been entered, including the drawing of the pool shape, and the credit card information signed, the written document is given to the customer.
8. When the pool company returns to the office the data from that job (along with any others completed in the day), the form is downloaded through the desktop computer (28) to a web site linked to the web server (part of the Application Server (26)), where the smart traffic rules (preferences) are applied. (In this case we assume that there is no need for a second level of validation, which could be available if required). Some of these smart rules would include sending the following information to the following recipients, in most cases the name and address would be included each time:
   a. The name and address and order information to the pool company's file
   b. The pool description, size, color etc., and due date to the pool manufacturer (may include drawing)
   c. The installation date and specification to the contractors
   d. The drawing and installation dates to the landscaper and installer
   e. Appropriate details to the City for the permit
   f. Credit card information (number, expiry, name, amount to the credit card company) to the financial institution. Verification of funds transfer would then be sent back to the company.

At this stage the main transaction would be basically complete, with the management of the installation now required, and a final payment for the next steps, made using the WoW SmartPad at the appropriate times.

At each stage of the follow up the transaction, the appropriate organization would clearly know what was required from them to complete the overall installation. Information would be forwarded to each party in a timely fashion and repetitive data input would be eliminated. This simplified tracking system would provide a degree of administrative support to organizations otherwise struggling to stay on top of the administrative part of their activities.

B. Example of the operation of the electronic clipboard (10) in a wireless environment.

Completion of a parking ticket by a law enforcement officer (see example in FIG. 7b)t 1. Creation of a smart form.

The smart form would be designed by the original forms company and made available to the law enforcement office. It would contain the following information:
  a. Name, address,
  b. Date and time
  c. Make, type, license plate of vehicle
  d. Details of offence (including fine)
  e. Law enforcement officer details
  f. Payment details 2. Inclusion of smart rules, by operation of the forms manager (36):

Each of the fields of the paper form (16) will include certain properties rules, such as the nature of the characters or fields being entered (i.e. text, numeric, picture), the rules of the text (date should be today's date) and smart rules, (whether a field is required or optional). In addition each field will contain and smart traffic preference rules (such as whether vehicle has other outstanding tickets, a valid permit to park in that location or is stolen).

3. Downloading of electronic form:

In this case the form would be preloaded onto the electronic clipboard (10), and a quantity of preprinted forms given to the law enforcement officer.

4. The parking ticket form (16) is placed on the electronic clipboard (10) and aligned by verifying two touch points with the pen (18), by operation of positive position verification, as particularized above.

5. The paper form (16) is then completed, one field at a time. A graphic representation of the handwriting will be displayed in the LCD display (22) as it is entered. As the next field is entered, the characters from the previous field will be converted to text using handwriting character recognition. If there is a validation error, there is an audible alarm.

6. If the user wishes to correct a piece of data input, then corrections are made as described above.

7. At the point where the address is entered, the smart traffic rules would immediately use the wireless link to see if a valid existing parking permit had been issued for that vehicle/location. If it had, then the whole form would be cancelled, if not then the LCD display (22) would indicate approval to proceed.

8. In certain jurisdictions the system might be used to verify in real time the number of outstanding tickets which had already been issued to a specific vehicle, so that more extreme actions can be taken. Alternatively the system can be used to rapidly verify if the vehicle is stolen.

9. Once the paper form (16) had been completed, then it would be transmitted to the main system dealing with parking tickets instantly, so that subsequent online payment and follow up could be dealt with expeditiously.

10. The paper version of the ticket could then be attached to the offending vehicle.

11. If the owner returned to the vehicle at this time and wished to pay the ticket at once, they could simply provide a credit card number, expiry date and signature and deal with the whole matter. If not the standard follow up system would be deployed.

12. The system would significantly reduce the current manual workload involved in collecting the forms, sorting them, re-entering them in the computer. It would reduce errors, increase speed of response and probably improve cash flow. In addition the additional functionality envisaged would have substantial non financial benefits for the parking enforcement agency such as reduced incidence of tickets being issued to cars with permits, speed of response of getting information on web site and simplified performance measurement.

Other extensions of the present invention are possible without departing therefrom. For example, the unit can be used to provide time and date verification of the completion of legal documents. With the addition of a GPS positioning board and a biometric sensor, the location and presence of people at a specific time and date can be verified.

We claim:

1. A method of capturing smart form data associated with a user, said smart form data comprising the steps of:
   (a) establishing one or more identification means operable to associate one or more ID data with individual users;
   b) providing an electronic clipboard having:
      (i) data memory;
      (ii) a marking means,
      (iii) a digital display; and
      (iv) a link to at least one identification means for identifying one or more users based on interaction of one or more of the one or more users with the at least one identification means;
   (c) making a smart form available to one or more users on an electronic clipboard, said smart form being generated by a positive position verification means whereby positions on the electronic clipboard are identified as aligned with positions on a paper form and whereby one or more data fields corresponding to one or more fields on the paper form are defined on the electronic clipboard, including one or more signature fields, to create a smart form;
   (d) utilizing a marking means to produce marks upon the electronic clipboard within the one or more data fields and a character recognition and conversion means to convert the marks upon the electronic clipboard to generate text data associated with the one or more data fields so as to enable the user to make entries to the smart form;
   (e) displaying the text data in a digital display whereby the one or more users may view the text data to verify and confirm the accuracy of the text data;
   (f) facilitating interaction by the one or more users interacting with the at least one identification means so as to provide the one or more ID data associated with the one or more users;
   (g) assembling smart form data, to include the text data, the one or more ID data and authentication data associated with the smart form;
   (h) storing the smart form data in one or more of the data memory and remote storage; and
   (i) transferring all or a portion of the smart form data to one or more remote servers and the one or more remote servers being operable to authenticate the smart form.

2. The method of capturing smart form data of claim 1 comprising the further step of receiving a verification notification indicating the success of the transfer of the all or a portion of the smart form data.

3. The method of capturing smart form data of claim 1 comprising the further steps of:
   (a) displaying the smart form data in real time;
   (b) storing smart form data in the data memory in real time; and
   (c) transferring all or a portion of the smart form data to the one or more servers in real time.

4. The method of capturing smart form data of claim 1 comprising one or more of the further steps of:
   (a) storing all or a portion of the smart form data to data memory that is local to the electronic clipboard; and
   (b) storing all or a portion of the smart form data to data memory that is remote from the electronic clipboard.

5. The method of capturing smart form data of claim 1 comprising the further step of utilizing one or more navigation tools to access and the smart form data on the digital display.

6. The method of capturing smart form data of claim 1 comprising the further step of making marks upon the electronic clipboard utilizing a marking means that is a pen operable to produce marks on the paper form and the smart form simultaneously.

7. The method of capturing smart form data of claim 1 comprising the further step of identifying the one or more users having completed the smart form through an authentication of the smart form data corresponding to the one or more signature fields and the one or more ID data.

8. The method of capturing smart form data of claim 1 comprising the further step of applying the identification means by one or more of the following steps:
   (a) interacting with a biometric sensor by at least one of the one or more users to produce the ID data;
   (b) using a camera to generate at least one still photo of the one or more users or video of the one or more users whereby the at least one still photo or the video provide ID data,
   (c) swiping a swipe card corresponding to one of the one or more users through a swipe card sensor to generate ID data;
   (d) reading a RFID tag corresponding to one or more of the one or more users by a RFID reader to produce ID data;
   (e) speaking into a voice identification means by at least one of the one or more users to produce ID data; and
   (f) applying one or more additional identification means to generate ID data corresponding to the one or more users individually.

9. The method of capturing smart form data of claim 1 comprising the further step of identifying the location of the electronic clipboard utilizing a location identification means that generates location data.

10. The method of capturing smart form data of claim 9 comprising the further step of identifying the location of the electronic clipboard when markings were made upon the electronic clipboard corresponding to the smart form and the one or more users that made the markings through the following steps:
    (a) identifying the one or more users by one or more of the following:
        (i) the one or more ID data; and
        (ii) the smart form data corresponding to the one or more signature fields;
    (b) identifying the location of the electronic clipboard through the location data;
    (c) identifying the time when the markings were made upon the electronic clipboard through the generation of time data;
    (d) identifying the date when the markings were made upon the electronic clipboard through the generation of date data; and
    (e) storing the ID data, the digital data of the one or more signature fields, the location data, the time data and the date data in the data memory as part of the smart form data.

11. The method of capturing smart form data of claim 1 comprising the further step of applying a global positioning system as the location identification means.

12. The method of capturing smart form data of claim 1 comprising the further steps to produce a legally binding electronic document:
    (a) requiring that smart form data be generated in accordance with a smart rule for at least one of the one or more signature data fields as signature data; and
    (b) generating one of more of the following:
        (i) time data and date data corresponding to the generation of smart form data; and
        (ii) location data identifying the location of the electronic clipboard utilizing a location identification means;
    whereby the smart form data may further include time data, date data, and location data.

13. The method of capturing smart form data of claim 12 comprising the further step of verifying the signature data utilizing a signature recognition means.

14. The method of capturing smart form data of claim 12 comprising one of the further steps of:
    (a) establishing the legally binding nature of the smart form utilizing the signature data;
    (b) establishing the legally binding nature of the smart form utilizing the signature data and the ID data;
    (e) establishing the legally binding nature of the smart form utilizing the signature data, the time data and the date data; and
    (d) establishing the legally binding nature of the smart form utilizing the signature data, the time data, the date data and the location data.

15. A electronic clipboard apparatus comprising:
    (a) data memory;
    (b) a link to at least one use means operable to produce use data corresponding to particular uses of the electronic clipboard;
    (c) a positive position verification means whereby a paper form is aligned with positions upon the electronic clipboard to produce a smart form having one or more data fields;
    (d) a marking means configured to produce markings on the paper form and markings on the electronic clipboard whereby the markings correspond to the one or more data fields is generated so as to enable the one or more users to make entries to the smart form;
    (e) a character recognition and conversion means whereby the markings upon the electronic clipboard may be converted to text data;
    (f) a digital display for the purpose of verifying and confirming the text data,
    (g) one or more data memory means wherein smart form data, including text data and use data may be stored; and
    (h) a transfer means whereby all or a portion of the smart form data is transferable to one or more of:

(i) one or more remote servers operable to authenticate the smart form; and
(ii) one or more remote storage means.

16. The electronic clipboard apparatus of claim 15 comprising a use means that is one or more of the following:
(a) an identification means operable to associate one or more ID data with at an individual user whereby ID data associated with at least one individual user may be generated through interaction by the one or more users with the identification means; and
(b) a location means whereby the location of the electronic clipboard while marks are made upon the electronic clipboard may be identified and location data may be generated.

17. The electronic clipboard apparatus of claim 16 wherein the location means is a global positioning system.

18. The electronic clipboard apparatus of claim 16 wherein the identification means is one or more of the following:
(a) a biometric sensor configured to produce the ID data corresponding to the one or more users individually;
(b) a swipe card sensor configured to transfer the ID data from a swipe card corresponding to the one or more users individually to the electronic clipboard;
(c) a RFID reader operable to read an RFID tag corresponding to one or more of the one or more users to produce ID data;
(d) using a camera to provide at least one still photo of the one or more users or video of the one or more users whereby the at least one still photo or the video is transferable as ID data to the electronic clipboard;
(e) a signature recognition means configured to verify markings made in the one or more signature fields to generate ID data corresponding to an individual user being one of the one or more users;
(f) a voice identification means configured to produce the ID data corresponding to an individual user being one of the one or more users; and
(g) one or more additional identification means to generate ID data corresponding to an individual user being one of the one or more users.

19. The electronic clipboard apparatus of claim 18 wherein the voice identification means utilizes a microphone linked to the electronic clipboard that the one or more users may speak into.

20. The electronic clipboard apparatus of claim 15 comprising one or more smart navigation controls whereby the markings made upon the electronic clipboard may be accessed for display on the display means.

21. The electronic clipboard apparatus of claim 15 comprising one or more of the following:
(a) a link between the electronic clipboard and one or more of the following:
(i) the one or more memory means;
(ii) the remote storage means; and
(iii) the one or more remote servers; and
(b) a wireless connection between the electronic clipboard and one or more of the following:
(i) the one or more memory means;
(ii) the remote storage means; and
(iii) the one or more remote servers;
whereby smart form data may be stored or transferred in real time or in lapsed time.

22. The electronic clipboard apparatus of claim 15 wherein the marking means is a pen.

23. A forms manager computer program product stored on a computer-readable medium for producing one or more smart forms comprising:

(a) a smart form generator operable to:
(i) generate a plurality of electronic forms corresponding to underlying paper forms whereby the position of fields on the paper form correspond to locations upon an electronic clipboard and the locations on the electronic clipboard are defined as one or more smart data field definitions;
(ii) define one or more data rules for each of the plurality of electronic forms, said data rules including at least the following:
(A) processing of markings made upon the electronic form by a marking means to produce text data; and
(B) authenticating a user or a computer associated with the smart form; and
(iii) store the plurality of electronic forms in data memory;
whereby a smart form is generated; and
(b) a forms manager operable to:
(i) select a smart form generated by the smart form generator for use upon the electronic clipboard whereby smart form data is generated; and
(ii) enable a traffic manager to facilitate routing of all or a portion of the smart form data from the electronic clipboard to one or more of the following:
(A) one or more servers operable to authenticate the smart form; and
(B) one or more storage means;
whereby the routing occurs in accordance with one or more communication rules defined as corresponding to the one or more smart forms, such communication rules being operable to establish the requisite path for authentication of the smart form.

24. The forms manager computer program product of claim 23 wherein the one or more smart data field definitions comprise one or more smart fields having properties and preferences.

25. The forms manager computer program product of claim 24 wherein the properties define at least one of the following:
(a) formatting of the digital data field definitions;
(b) validation requirements; and
(c) authentication requirements;
corresponding to the one or more smart fields.

26. The forms manager computer program product of claim 24 wherein the preferences define workflow in relation to the traffic manager corresponding to the one or more smart fields.

27. The forms manager computer program product of claim 23 wherein the traffic manager is operable to perform encryption of all or a portion of the smart form data prior to the routing.

28. The forms manager computer program product of claim 23 wherein the traffic manager is operable to facilitate smart routing to one or more servers in accordance with defined smart form policies using multiple routing schemas triggered by a single smart form.

29. The forms manager computer program product of claim 23 wherein the traffic manager is operable to facilitate real time routing of all or a portion of smart form data.

30. The forms manager computer program product of claim 23 wherein the traffic manager is operable to rout smart form data utilizing a direct link means or wireless communication means.

31. An electronic clipboard workflow method comprising the steps of:

(a) creating one or more smart forms for use with an electronic clipboard using a forms manager involving the following steps:
   (i) generating a unique identification number for each one or more smart forms;
   (ii) choosing a paper size for the smart form;
   (iii) creating a scanned image of a paper form and matching the scanned image to an alignment grid corresponding to the electronic clipboard;
   (iv) using an authoring tool to drag and drop one or more pre-defined fields to be smart form fields utilized by the smart form and to adjust the size and location of the one or more smart form fields;
   (v) setting the properties of the smart form fields; and
   (vi) storing the smart form in data memory;
(b) providing an electronic clipboard operable for one or more users to choose one of the one or more smart forms;
(c) completing the smart form performed by the one or more users by marking the electronic clipboard utilizing a marking means;
(d) converting the markings to text data utilizing a character recognition application;
(e) displaying the text data in a digital display whereby the text data may be verified and corrected;
(f) encrypting smart form data that includes the text data, and saving the data to the data memory;
(g) routing all or a portion of the smart form data to one or more servers or one or more desktop computers; and
(h) verifying the successful routing of the smart form data.

32. A method of electronic clipboard workflow of claim 31 comprising the further steps of:
(a) marking the electronic clipboard with a marking means that is a pen;
(b) applying one or more smart controls to access the text data;
(c) displaying the text data in the digital display in real time; and
(d) routing data when the electronic clipboard is docked to the one or more desktop computers.

33. A method of electronic clipboard workflow of claim 31 comprising the further steps of:
(a) storing all or a portion of the smart form in local data memory of the electronic clipboard; or
(b) storing all or a portion of the smart form data in remote data memory of:
   (i) the one or more desktop computers; or
   (ii) the one or more servers.

* * * * *